(12) United States Patent
Tong et al.

(10) Patent No.: US 9,872,279 B2
(45) Date of Patent: Jan. 16, 2018

(54) METHOD FOR DETERMINING CHANNEL QUALITY INDICATOR, BASE STATION AND USER EQUIPMENT THEREFOR

(75) Inventors: Hui Tong, Beijing (CN); Masayuki Hoshino, Kanagawa (JP); Daichi Imamura, Beijing (CN); Ming Xu, Beijing (CN)

(73) Assignee: Sun Patent Trust, New York, NY (US)

(*) Notice: Subject to any disclaimer, the term of this patent is extended or adjusted under 35 U.S.C. 154(b) by 223 days.

(21) Appl. No.: 14/114,883

(22) PCT Filed: Sep. 29, 2011

(86) PCT No.: PCT/CN2011/080373
§ 371 (c)(1),
(2), (4) Date: Oct. 30, 2013

(87) PCT Pub. No.: WO2013/044482
PCT Pub. Date: Apr. 4, 2013

(65) Prior Publication Data
US 2014/0064234 A1    Mar. 6, 2014

(51) Int. Cl.
*H04W 72/04* (2009.01)
*H04B 7/024* (2017.01)
(Continued)

(52) U.S. Cl.
CPC ........ *H04W 72/0413* (2013.01); *H04B 7/024* (2013.01); *H04B 7/0632* (2013.01);
(Continued)

(58) Field of Classification Search
USPC .......................................... 370/329; 455/453
See application file for complete search history.

(56) References Cited

U.S. PATENT DOCUMENTS 8,139,498 B2    3/2012    Seo et al.
8,498,639 B2    7/2013    Chen et al.
(Continued)

FOREIGN PATENT DOCUMENTS

CN    101606414 A    12/2009
CN    101841847 A    9/2010
(Continued)

OTHER PUBLICATIONS

Nan et al., CN 101854658 A, Oct. 6, 2010, Method and system for processing channel quality indication information, (English translation from Google Patents), whole document.*
(Continued)

*Primary Examiner* — Hanh N Nguyen
*Assistant Examiner* — Jose L Perez
(74) *Attorney, Agent, or Firm* — Seed IP Law Group LLP

(57) ABSTRACT

A base station and a related method are provided. The base station includes a transmitter which, in operation, transmits, to a user equipment (UE), values configured for different base station coordination types, respectively, wherein each of the base station coordination types defines which base stations among multiple base stations perform coordinated transmission in that base station coordination type. The base station further includes a receiver which, in operation, receives a channel quality indicator (CQI) reported from the UE, wherein the CQI is calculated at the UE in reference to the values.

14 Claims, 3 Drawing Sheets

Table 1

| hypoth. | | Macro | LPN1 | LPN2 | Macro Heavy Load | Macro /LPN1 HL | Orig. CQI | New CQI1 | New CQI2 |
|---|---|---|---|---|---|---|---|---|---|
| 1 | 3 base stations | data | data | data | 9 | 9 | 14 | 5 | 5 |
| 2 | 2 base stations | data | data | mute | 8 | 9 | 13 | 5 | 4 |
| 3 | | data | data | interference | 8 | 9 | 12 | 4 | 3 |
| 4 | | data | mute | data | 7 | 7 | 13 | 6 | 6 |
| 5 | | data | interference | data | 7 | 5 | 11 | 4 | 6 |
| 6 | | mute | data | data | 3 | 6 | 11 | 8 | 5 |
| 7 | | interference | data | data | 0 | 7 | 11 | 11 | 4 |
| 8 | 1 base station | data | mute | mute | 8 | 6 | 8 | 0 | 2 |
| 9 | | data | mute | interference | 8 | 6 | 7 | -1 | 1 |
| 10 | | data | interference | mute | 8 | 6 | 7 | -1 | 1 |
| 11 | | data | interference | interference | 8 | 6 | 6 | -2 | 0 |
| 12 | | mute | data | mute | 3 | 5 | 7 | 4 | 2 |
| 13 | | mute | data | interference | 3 | 5 | 6 | 3 | 1 |
| 14 | | interference | data | mute | 1 | 5 | 6 | 5 | 1 |
| 15 | | interference | data | interference | 1 | 5 | 6 | 5 | 1 |
| 16 | | mute | mute | data | 3 | 0 | 8 | 5 | 8 |
| 17 | | mute | interference | data | 3 | 0 | 7 | 4 | 7 |
| 18 | | interference | mute | data | 1 | 0 | 6 | 5 | 6 |
| 19 | | interference | interference | data | 1 | 0 | 5 | 4 | 5 |

(51) Int. Cl.
   *H04B 7/06* (2006.01)
   *H04L 1/00* (2006.01)
   *H04L 5/00* (2006.01)
   *H04W 28/08* (2009.01)
   *H04L 25/02* (2006.01)
   *H04W 16/32* (2009.01)

(52) U.S. Cl.
   CPC .......... *H04L 1/0015* (2013.01); *H04L 1/0026* (2013.01); *H04L 5/0035* (2013.01); *H04L 5/0075* (2013.01); *H04L 25/0208* (2013.01); *H04W 16/32* (2013.01); *H04W 28/08* (2013.01)

(56) References Cited

U.S. PATENT DOCUMENTS

| | | |
|---|---|---|
| 2005/0170782 A1 | 8/2005 | Rong et al. |
| 2008/0013610 A1 | 1/2008 | Varadarajan et al. |
| 2008/0188260 A1 | 8/2008 | Xiao et al. |
| 2008/0214198 A1 | 9/2008 | Chen et al. |
| 2010/0061258 A1 | 3/2010 | Seo et al. |
| 2010/0271968 A1* | 10/2010 | Liu .................... H04L 25/0202 370/252 |
| 2011/0002406 A1* | 1/2011 | Ming .................. H04L 25/0204 375/260 |
| 2012/0213113 A1 | 8/2012 | Zhao et al. |
| 2012/0257568 A1* | 10/2012 | Cai et al. ...................... 370/328 |

FOREIGN PATENT DOCUMENTS

| | | | |
|---|---|---|---|
| CN | 101854658 A * | 10/2010 | |
| EP | 2 164 186 A2 | 3/2010 | |
| EP | 2 178 324 A1 | 4/2010 | |
| WO | 2008054143 A1 | 5/2008 | |
| WO | WO 2010124725 A1 * | 11/2010 | |
| WO | 2010/140854 A2 | 12/2010 | |
| WO | WO 2011010863 A2 * | 1/2011 | ............ H04L 5/0057 |
| WO | 2011/014583 A2 | 2/2011 | |
| WO | WO 2011040751 A2 * | 4/2011 | ............ H04L 1/0025 |
| WO | 2011/050727 A1 | 5/2011 | |
| WO | 2011/115421 A2 | 9/2011 | |
| WO | WO 2012167424 A1 * | 12/2012 | ............. H04B 7/024 |

OTHER PUBLICATIONS

Panasonic, R1-112360, 3GPP TSG RAN WG1 Meeting #66, Operation of Traffic Offloading in RRH-based Heterogeneous Network and Possible Spec Impact, whole document.*
Unknown, Coordinated Multipoint of LTE, Coordinated Multipoint website; downloaded from web.archive.org/web/20110520114436/http://radio-electronics.com/info/cellulartelecomms/lte-long-term-evolution/4g-lte-advanced-comp-coordinated-multipoint.php , whole document.*
Panasonic, R1-112360, 3GPP TSG RAN WG1 Meeting #66, Operation of Traffic Offloading in RRH-based Heterogeneous Network and Possible Spec Impact, Aug. 22-26, 2011, whole document.*
Motorola Mobility, R1-112441, 3GPP TSG RAN1 #66, Coordinated Scheduling (CS) Schemes with Low Power RRH: Details and Phase-2 Evaluations Results, Aug. 22-26, 2011, whole document.*
Motorola Mobility, R1-112441,3GPP TSG RAN1 #66, Coordinated Scheduling (CS) Schemes with Low Power RRH: Details and Phase-2 Evaluations Results, Aug. 22-26, 2011, whole document.*
International Search Report dated Jul. 12, 2012, for corresponding International Application No. PCT/CN2011/080373, 2 pages.
3GPP TR 36.819 V1.2.0, "3rd Generation Partnership Project; Technical Specification Group Radio Access Network; Coordinated Multi-Point Operation for LTE Physical Layer Aspects (Release 11)," Sep. 2011, 70 pages.
Extended European Search Report dated Jan. 27, 2015, for corresponding EP Application No. 11873496.1-1851 / 2700261, 11 pages.
Panasonic, "Operation of Traffic Offloading in RRH-based Heterogeneous Network and Possible Spec Impact," R1-112360, 3GPP TSG RAN WG1 Meeting #66, Agenda Item: 6.5.2 Study on Coordinated Multi-Point Operation for LTE; Standardisation impact, Athens, Greece, Aug. 22-26, 2011, 4 pages.
Qualcomm Europe, "Initial Evaluation of Relay Performance on DL," R1-091456, 3GPP TSG-RAN WG1 #56bis, Agenda Item: 15.3, Seoul, South Korea, Mar. 23-27, 2009, 10 pages.
Singapore Invitation to Respond to Written Opinion dated May 8, 2015, for corresponding SG Patent Application No. 2013082276, 21 pages.
Patent Examination Report No. 3, dated Aug. 5, 2016, for corresponding Australian Application No. 2011378051, 4 pages.

* cited by examiner

Table 1

| hypoth. | | Macro | LPN1 | LPN2 | Macro Heavy Load | Macro /LPN1 HL | Orig. CQI | New CQI1 | New CQI2 |
|---|---|---|---|---|---|---|---|---|---|
| 1 | 3 base stations | data | data | data | 9 | 9 | 14 | 5 | 5 |
| 2 | 2 base stations | data | data | mute | 8 | 9 | 13 | 5 | 4 |
| 3 | | data | data | interference | 8 | 9 | 12 | 4 | 3 |
| 4 | | data | mute | data | 7 | 7 | 13 | 6 | 6 |
| 5 | | data | interference | data | 7 | 5 | 11 | 4 | 6 |
| 6 | | mute | data | data | 3 | 6 | 11 | 8 | 5 |
| 7 | | interference | data | data | 0 | 7 | 11 | 11 | 4 |
| 8 | 1 base station | data | mute | mute | 8 | 6 | 8 | 0 | 2 |
| 9 | | data | mute | interference | 8 | 6 | 7 | -1 | 1 |
| 10 | | data | interference | mute | 8 | 6 | 7 | -1 | 1 |
| 11 | | data | interference | interference | 8 | 6 | 6 | -2 | 0 |
| 12 | | mute | data | mute | 3 | 5 | 7 | 4 | 2 |
| 13 | | mute | data | interference | 3 | 5 | 6 | 3 | 1 |
| 14 | | interference | data | mute | 1 | 5 | 6 | 5 | 1 |
| 15 | | interference | data | Interference | 1 | 5 | 6 | 5 | 1 |
| 16 | | mute | mute | data | 3 | 0 | 8 | 5 | 8 |
| 17 | | mute | interference | data | 3 | 0 | 7 | 4 | 7 |
| 18 | | interference | mute | data | 1 | 0 | 6 | 5 | 6 |
| 19 | | interference | interference | data | 1 | 0 | 5 | 4 | 5 |

Fig. 2B

METHOD FOR DETERMINING CHANNEL QUALITY INDICATOR, BASE STATION AND USER EQUIPMENT THEREFOR

TECHNICAL FIELD

The present disclosure relates to Channel Quality Indicator (CQI) determination and traffic offloading in base station cooperation.

BACKGROUND

Base station cooperation in a heterogeneous network is an important means to improve the performance, e.g., throughput, of communication systems. In the heterogeneous network, the transmission power from different base stations may be very different and accordingly the coverage areas of the base stations are different. Specifically, the coverage area of a high power base station, i.e. a high power node (macro) is much larger than the coverage area of a low power base station, i.e. a lower power node (LPN), and the coverage area of the LPN may overlap with that of the macro, as shown in FIG. 1. Because of the large coverage area of the macro and the small coverage area of the LPN, a large number of UEs are in the coverage area of the macro and will be served by the macro while only a small portion of UEs will be served by the LPNs, which results in a heavy load on the macro and an inefficient use of spectral resources of LPNs. To improve the spectral usage of LPNs as well as to reduce the load on the macro, it is preferred to assign more UEs to be served by the LPN, even when the power received from the macro is higher than the power received from the LPN. This is a so called traffic offloading.

There are multiple possible types of base station cooperation, and each type may yield a traffic offloading in different level. For example, as shown in FIG. 1, a joint transmission (JT) from the macro and the LPN1 or LPN2 causes more macro traffic than a JT from the LPN1 and LPN2, and hence is less preferred from the traffic offloading point of view. In other words, in case the macro is heavily loaded and the LPNs are lightly loaded, it is desired to avoid the joint transmission involving data transmitted from the macro, e.g., the joint transmission from macro and LPN1. In this document, joint transmission refers to that the UE receives data from multiple base stations simultaneously.

A simple operation that enables traffic offloading may be as following: first, each UE report one CQI to base stations, where the CQI is calculated at UE assuming a base station cooperation type friendly to traffic offloading; second, a scheduler included in the base station (which could alternatively be located separately from the base stations in the heterogeneous network) calculates Proportional Fairness (PF) metric of each UE based on the reported CQI to make a resource allocation; third, the scheduler allocates for example Physical Downlink Shared Channel (PDSCH) to UEs based on the calculated PF metric; note that here the PDSCH transmission in general may follow the base station cooperation assumed in UE CQI calculation.

To enable the more flexible traffic offloading, a further operation may be as following: first, each UE report two CQIs to base stations, where different CQI is calculated assuming different types of base station cooperation (and consequently assuming different traffic load); second, based on the load condition, a scheduler included in the base station (which could alternatively be located separately from the base stations in the heterogeneous network) internally decide on which subframe(s) the macro is allowed to carry out the first type and the second type of base station cooperation, respectively; third, the scheduler calculates Proportional Fairness (PF) metric of each UE on a certain subframe to make a resource allocation, the PF metric is calculated based on allowed base station cooperation on that certain subframe; fourth, the scheduler allocates for example PDSCH to UEs based on the calculated PF metric; note that here the PDSCH transmission in general may follow the base station cooperation assumed in the relevant UE CQI calculation.

Both of the above operations require the UE to report CQI(s). In general, different types of base station cooperation lead to different CQIs. Therefore, there is a problem how to decide which base station cooperation should be assumed in CQI calculation. In short, the problem is how to decide which CQI should be reported.

The first possible solution is to let the UE decide which CQI(s) should be reported. However the UE selected CQI could be very off because the traffic load conditions at base stations are unknown to the UE. If the UE merely selects the highest CQI(s), then it is likely that the highest CQI(s) cause heavy traffic load at the macro, which means that traffic offloading operation at base stations is not possible.

The second possible solution is to feedback CQIs based on a base station signalling. That is to say, the base station indicates UE which two CQIs should be reported. However, this solution has following defects. On one hand, the base station selection is not optimal because the base station does not know which CQI(s) are the highest at UE. Therefore base station selection does not guarantee optimal performance. On the other hand, even if in some case the base station has knowledge of which CQI(s) are the highest, the downlink signalling overhead is too much because highest CQI(s) may change dynamically. For example, if the signalling is send through Physical Downlink Control Channel (PDCCH), which is a dynamic downlink signalling, the downlink signalling overhead may be intolerable. If the signalling is send through Radio Resource Control (RRC), which is a semi-static downlink signalling, the configuration can not be changed quickly. Because the highest CQI may changes much faster than RRC configuration, the semi-statically configuration from base station maybe not yields best performance.

SUMMARY OF THE DISCLOSURE

In one aspect of the present disclosure, there is provided a method for determining Channel Quality Indicators (CQI) to be reported by User Equipments (UE), comprising steps of: assigning a sequence of adjustment factors to various possible base station cooperation; transmitting the assigned adjustment factors to UEs; calculating an original CQI for each possible base station cooperation in each UE; adjusting the original CQIs based on the received adjustment factors in UEs; and reporting one or multiple original CQI(s) that are the highest after the aforesaid adjustment and knowledge of which CQI is reported to the base station by each UE.

In another aspect of the present disclosure, there is provided a method for dynamically determining Channel Quality Indicators (CQI) to be reported by User Terminals (UE), comprising the steps of: assigning an adjustment factor to each base station; transmitting the assigned adjustment factors to UEs; calculating an original CQI for each possible base station cooperations in each UE; adjusting the original CQIs based on the received adjustment factors in UEs; and reporting one or multiple original CQI(s) that are the highest after the aforesaid adjustment and knowledge of which CQI is reported to the base station by each UE.

In a further aspect of the present disclosure, there is provided a base station for determining Channel Quality Indicators to be reported, comprising: an assignment unit, assigning adjustment factors used to adjust original CQIs; an adjustment factor transmitting unit, transmitting the assigned adjustment factors to User Equipments; a receiving unit, receiving the knowledge of which CQI is reported and the corresponding CQI from User Equipments; a scheduling unit, which allocates spectral resources to User Equipments based on the knowledge of which CQI is reported and the corresponding CQI.

In a further aspect of the present disclosure, there is provided a user equipment for determining Channel Quality Indicators to be reported, comprising: an adjustment receiving unit, receiving adjustment factors from a base station; a calculation unit, calculating an original CQI for each possible base station cooperation; an adjustment unit, adjusting the original CQIs based on the received adjustment factors; a reporting unit, reporting one or multiple original CQI(s) that are the highest after the aforesaid adjustment and knowledge of which CQI is reported to the base station.

In the present disclosure, UEs dynamically determine the optimal CQIs to be reported by adjusting the original CQIs based on the adjustment factors assigned by the base station. Thus, the traffic offloading is enabled and the defect of performance loss can be fixed.

The foregoing is a summary and thus contains, by necessity, simplifications, generalization, and omissions of details; consequently, those skilled in the art will appreciate that the summary is illustrative only and is not intended to be in any way limiting. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 2B is a table (Table 1) listing many possible types of base station cooperation;

DETAILED DESCRIPTION

Figure 1:
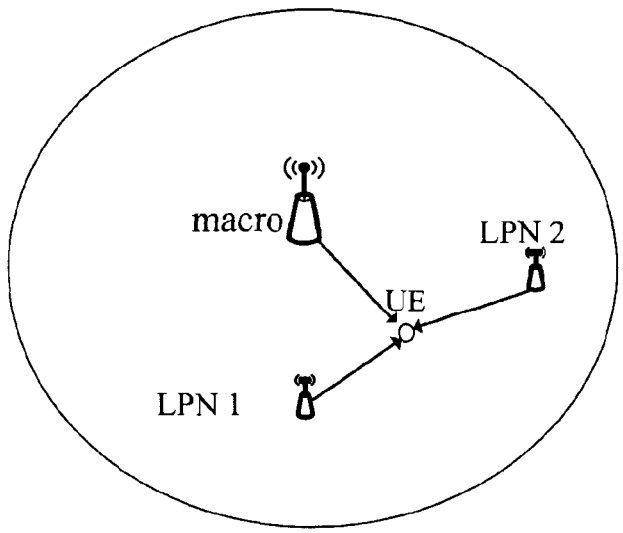
FIG. 1 is a schematic diagram showing an example of a heterogeneous network.

In the following detailed description, reference is made to the accompanying drawings, which form a part hereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

First Embodiment

A method of dynamically determining Channel Quality Indicators (CQI) to be reported by User Equipments (UE) is described in the present embodiment. According to this method, the UE calculates original CQIs according to CQI calculation hypotheses corresponding to various base station cooperations; adjusts the original CQIs based on adjustment factors indicated by the base station; and report the proper CQIs. Through this method, when the adjustment factors reflects the load conditions at base stations, the UE can report CQIs by taking into account the traffic load conditions as indicated by the base station. Therefore, the traffic offloading is enabled and the defect of performance loss can be avoided.

Figure 2A:
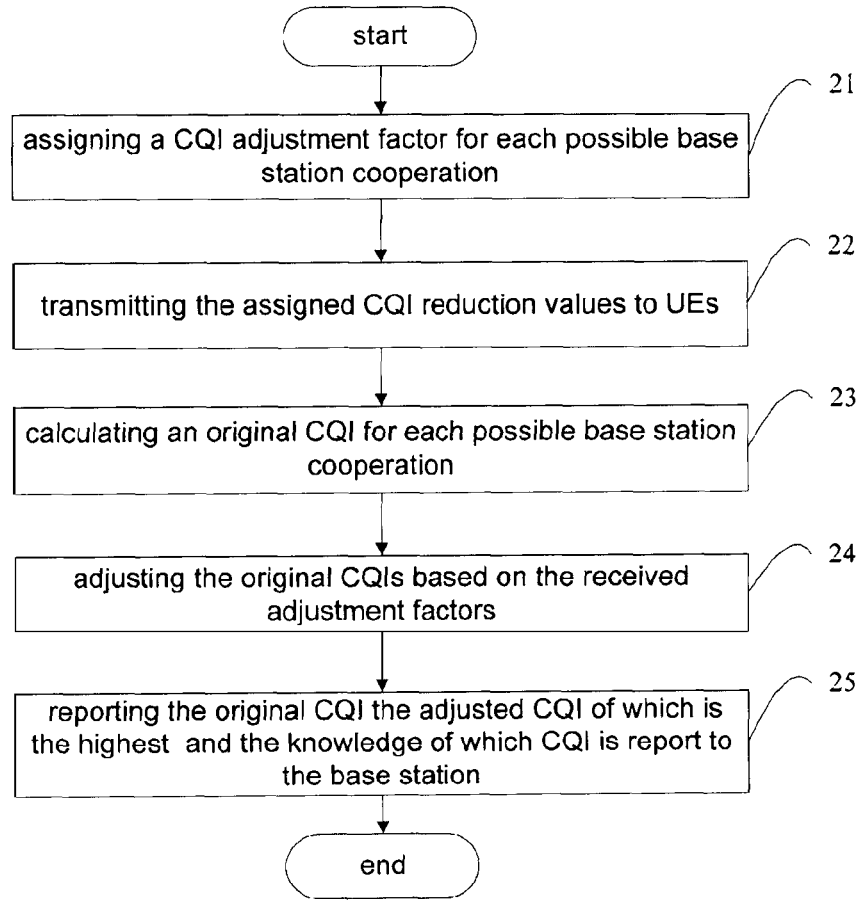
FIG. 2A is flowchart illustrating a method for dynamically determining CQIs to be reported by UEs in base station cooperation according to the first embodiment of the present disclosure.

FIG. 2A is a diagram showing a flow chart of a method of dynamically determining CQIs to be reported according to the first embodiment of the present disclosure. In the following, the method will be described in detail with reference to FIG. 2A, taking a macro and two LPNs (LPN1 and LPN2) carrying out the base station cooperation as an example.

As shown in table 1 in FIG. 2B, there are many possible types of base station cooperation, and each of them has a traffic offloading in different level. In step 21, a base station assigns a CQI adjustment factor, for example, a CQI reduction value, for each possible base station cooperation, where the sequence of CQI adjustment factor may be decided based on the load conditions at multiple base stations or any other factors, such as the backhaul condition of network. For example, if the macro is heavily loaded, while LPN1 and LPN2 are lightly loaded, the scheduler would configure base station cooperations that the macro transmits data therein with high CQI reduction values. And the more heavily the macro is loaded, the higher the CQI reduction value is assigned to the related base station cooperation. As a certain instance, the CQI reduction values may as shown in the column of "Macro Heavy Load" in table 1. For another example, if the macro and the LPN1 are heavily loaded, the scheduler would configure base station cooperations that the macro or the LPN1 transmits data therein with high CQI reductions. As a certain instance, the CQI reduction values may as shown in the column of "Macro/LPN 1 HL" in table 1. Then, in step 22, the assigned CQI reduction values are transmitted to UEs. As an example, the reduction values may be transmitted through RRC or MAC (Media Access Control) or PDCCH (Physical Downlink Control Channel).

In step 23, the UE calculates an original CQI for each possible base station cooperation. Specifically, when the UE is requested to report CQIs or prepares to report CQI periodically, UE calculates original CQIs based on various possible CQI calculation hypotheses each corresponds to a possible base station cooperation. There are various methods of calculating original CQIs, a possible one could be the UE calculates signal power, interference power and noise power respectively, and then based on reference signals and relevant data from base station(s), map the signal to interference and noise ratio (SINR) to certain modulation and coding scheme (MCS) according to a predefined CQI table. The details of how to calculate signal power, interference power and noise power as well as how to map the SINR to certain modulation and coding based on reference signals and relevant data from base stations are well known for those skilled in the art and also out of the scope of this disclosure, which are henceforth omitted. As shown in table 1 in FIG. 26, in case the base station cooperation is carried out by a macro and two LPNs (LPN1 and LPN2), there are 19 possible base station cooperations and accordingly 19 CQI calculations hypotheses. So the UE calculates original CQIs according to the 19 CQI calculation hypotheses and obtains 19 original CQIs. As a certain instance, the original CQIs may as shown in the column of "Orig. CQI" in table 1. It is obvious that the original CQIs are calculated without considering the load condition on the base stations.

Then, in step 24, the UE adjusts the original CQIs based on the received adjustment factors. In the present embodiment, the adjustment factors are CQI reduction values. Therefore, with respect to each original CQI, the UE subtract the corresponding CQI reduction values therefrom, and then obtains the adjusted CQI. For example, as shown in table 1 in FIG. 2B, with respect to the case that the macro is heavily loaded and LPN1 and LPN2 are lightly loaded, UE subtracts the values shown in the column of "Macro Heavy Load" from the original CQIs shown in the column of "Orig. CQI", and obtains the adjusted CQIs as shown in the column of "New CQI1". For another example, with respect to the case that the macro and LPN1 are heavily loaded, UE subtracts the values shown in the column of "Macro/LPN1 HL" from the original CQIs shown in the column of "Orig. CQI", and gets the adjusted CQIs as shown in the column of "New CQI2".

Then, in step 25, UE reports to the base station the original CQI that are the highest after the aforesaid adjustment and the knowledge of which CQI is reported. As shown in table 1 in FIG. 2B, if the CQIs are not adjusted, the original CQI corresponding to the base station cooperation shown in hypothesis 1 (i.e. Macro and two LPNs all transmit data therein) will be reported. However, after applying the CQI adjust factor, the original CQI corresponding to the base station cooperation shown in hypotheses 7 (i.e. two LPNs transmit data therein) is reported in case that the Macro is heavily loaded, and the original CQI corresponding to the base station cooperation shown in hypotheses 16 (i.e. only LPN2 transmits data therein) is reported in case that the Macro and LPN1 are heavily loaded.

It can be seen, through the above described method according to the present embodiment, optimal CQI is reported considering the traffic load condition on the base station, and thus enables the traffic offloading operation on the base station.

On the other hand, if there is a base station particularly friendly to the UE, for example, the original CQI calculated based on hypothesis 12 results CQI=13. Then UE would still report CQI in hypothesis 12 after applying the aforesaid adjustment step of the method according to the present embodiment, although LPN1 is heavily loaded.

It should be noted that although in the above description UE reports the highest CQI to the base station in step 25, however, it is only an example and not a limitation. In fact, UE can report two or multiple highest CQIs to the base station.

It should also be noted that although in the present embodiment the method is described in an order from step 21 to step 25, however, the carrying out order of the steps is not fixed. For example, step 23 can be carried out before steps 21 and 22.

Furthermore, in the above description, CQI reduction values are positive, so the original CQIs are reduced by subtracting the CQI reduction values therefrom. However, the CQI reduction values can also be negative. For example, when a base station is lightly loaded, a negative CQI reduction value, such as −5, can be assigned to the base station cooperation which involves data transmission from that particular base station. In that case, the original CQI calculated based on the CQI hypothesis corresponding to the base station cooperation will be increased by subtracting the negative CQI reduction value therefrom.

Second Embodiment

The first embodiment is described above by taking the CQI reduction value as an example of the adjust factor. In fact, the adjust factor can be any other types of value, such as weighting coefficient. For example, if the macro is heavily loaded, while LPN1 and LPN2 are lightly loaded, the base station cooperations that the macro transmits data therein may be configured with a small weighting coefficient. And the more heavily the macro is loaded, the smaller weighting coefficient may be assigned to the related base station cooperation. In this instance, in step 24, the UE adjusts the original CQIs by multiplying each original CQI by a corresponding weighting coefficient. The operations in other steps are the same with those in the first embodiment, and thus will not be described repeatedly herein.

Third Embodiment

The method of the present embodiment is substantially the same as that of the first embodiment, except that the base station transmits to UEs multiple sequences of adjustment factors. Each sequence may correspond to different load conditions. Specifically, in the first embodiment, a sequence of adjustment factors is assigned to various possible base station cooperations, while in the present embodiment, multiple sequences, for example two sequences, of adjustment factors are assigned to various possible base station cooperations, wherein one sequence corresponds to the macro heavily loaded, and another one corresponds to the macro lightly loaded. The two sequences may have some common part, and thus in step 22, possibly only the first sequence and the different parts of the second sequence will be transmitted to UEs. In step 24, the UE adjusts the original CQIs based on said two sequences of adjustment factors respectively. Then, in step 25, the UE reports one highest CQI with respect to each sequence. According to the present embodiment, the base station can freely select the reported CQIs corresponding to different macro loads to perform traffic offloading.

Fourth Embodiment

In the above description, in step 21, each possible base station cooperation is assigned with an adjustment factor according to load conditions of the base station, and all the adjustment factors are transmitted to the UEs through for example RRC or MAC or PDCCH. However, in case that the number of the possible base station cooperation is large, the overhead for transmitting the adjustment factors becomes a problem. Considering the overhead problem, in the present embodiment, instead of assigning an adjustment factor to each possible base station cooperation, an adjustment factor is assigned to several possible base station cooperations. For example, if a same adjustment factor is assigned to each two possible base station cooperations, the adjustment factors need to be transmitted to the UEs may reduce to half. Accordingly, the overhead can be reduced.

Fifth Embodiment

The above fourth embodiment proposes an improved technical solution for reducing the overhead. In the present embodiment, another improved technical solution for reducing the overhead will be given.

In the present embodiment, in step 21, instead of assigning adjustment factors to various possible base station cooperations, each base station is assigned with an adjustment factor. For example, the macro may be assigned a CQI reduction value of 6, and the LPN1 and LPN2 may be assigned CQI reduction values of 3 and 1, respectively. Then, in step 24, the original CQIs calculated with respect to various possible base station cooperations will be adjusted by subtracting corresponding CQI reduction values based on if the base stations transmit data in the base station cooperation. For example, as for the original CQI calculated based on the base station cooperation that only the macro transmits data therein, the CQI reduction value of 6 will be subtracted from the original CQI; as for the original CQI calculated based on the base station cooperation that all the macro and the LPNs transmit data therein, all the CQI reduction values of 6, 3 and 1 will be subtracted from the original CQI.

The present embodiment enables very low overhead. For example, as for 3 base stations cooperation, only 3 adjustment factors need to be transmitted to the UE instead of 19 adjustment factors as described in the first embodiment.

Sixth Embodiment

The above embodiments are given by taking a macro and two LPNs (LPN1 and LPN2) carrying out the base station cooperation as an example. In fact, the method described above can be applied to the case of two base stations (such as a macro and a LPN) or more than three base stations (such as a macro and a plurality of LPNs).

As for the two base stations cooperation, there are 5 possible base station cooperations and accordingly 5 CQI calculations hypotheses as shown in table 2.

TABLE 2

| hypotheses | Macro | LPN |
| --- | --- | --- |
| 1 | 2 base stations data | data |
| 2 | 1 base station data | mute |
| 3 | data | interference |
| 4 | mute | data |
| 5 | interference | data |

The method of dynamically determining CQIs to be reported by UE in case of two base stations cooperation is the same as that described in the first embodiment, which will not be repeatedly described.

In the above description, the method of dynamically determining CQIs to be reported by UE according to the present application has been disclosed. In the following, the structure of the base station determining CQIs to be reported will be described with reference to FIG. 3.

Figure 3:
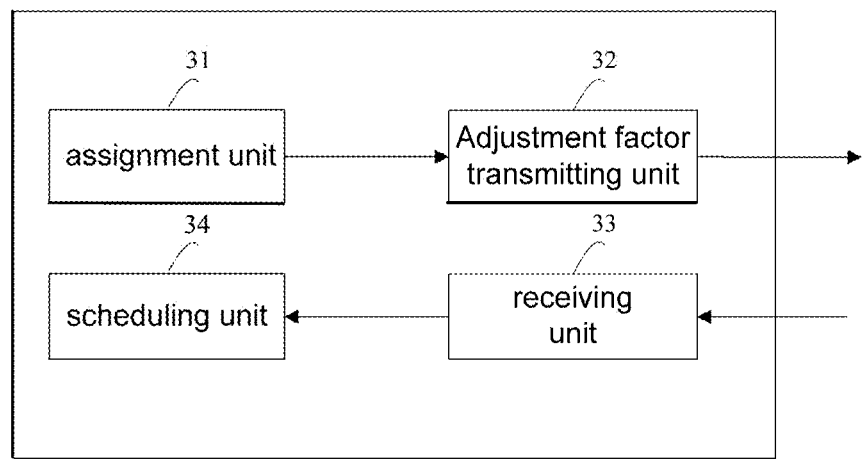
FIG. 3 is a diagram schematically illustrating a configuration example of the scheduler according to the present disclosure.

As shown in FIG. 3, the base station comprises assignment unit 31, which assigns adjustment factors used to adjust original CQIs to various possible base station cooperations; an adjustment factor transmitting unit 32, which transmits the assigned adjustment factors to User Equipments; a receiving unit 33, which receives the knowledge of which CQI is reported and the corresponding CQI from User Equipments; and a scheduling unit 34, which allocates spectral resources to User Equipments based on the knowledge of which CQI is reported and the corresponding CQI.

It should be noted that instead of assigning adjustment factors to various possible base station cooperations, the assignment unit 31 can assign adjustment factors to base stations, like the above fifth embodiment of the present application. And the adjustment factors may be decided based on the load conditions at multiple base stations or any other factors such as the backhaul condition of network.

It should also be noted that the base station may further comprises a reference signal and data transmitting unit, which transmits to UEs a reference signal and relevant data which can be used for calculating original CQIs at UE.

Figure 4:
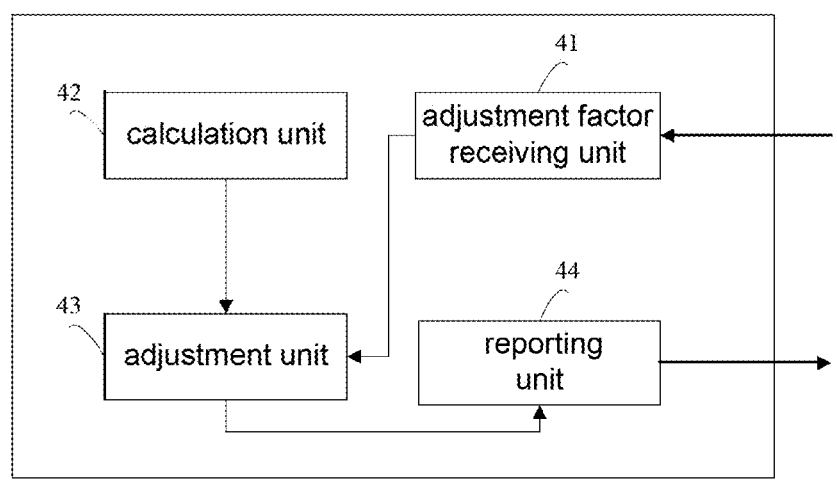
FIG. 4 is a diagram schematically illustrating a configuration example of the UE according to the present disclosure.

In the following, the structure of the UE will be described with reference to FIG. 4. As shown in FIG. 4, the UE comprises an adjustment factor receiving unit 41, which receives adjustment factors from a base station; a calculation unit 42, which calculates an original CQI for each possible base station cooperation; an adjustment unit 43, which adjusts the original CQIs based on the received adjustment factors; and a reporting unit 44, which reports to the base station one or multiple original CQI(s) that are the highest after the aforesaid adjustment and knowledge of which CQIs are reported. It can be easily understood that the received adjustment factors are assigned for base stations or assigned for various possible base station cooperations by the base station.

The calculation unit 42 can calculate the original CQIs in any well known manner. In a possible manner, the UE further comprises a reference signal and data receiving unit 45, which receives from the base station a reference signal and relevant data which can be used for calculating original CQIs, and the calculation unit 42 calculates the original CQIs based on the received reference signal and relevant data.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of those skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skills in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by a base station for receiving a channel quality indicator (CQI), the method comprising:
    setting a CQI adjustment value for a base station coordination type, the base station coordination type defining which base stations among a plurality of base stations perform coordinated transmission, the CQI adjustment value being set according to traffic loading conditions of the plurality of base stations;
    transmitting, to a user equipment (UE), the CQI adjustment value;
    receiving the CQI reported from the UE, the CQI being calculated at the UE in reference to the CQI adjustment value; and
    assigning a resource to the UE in reference to the received CQI.

2. The method according to claim 1, wherein the base station coordination type is one of a plurality of base station coordination types that are hypotheses defining different coordinated transmissions performed by the plurality of base stations, each of which performs transmission of data or no transmission of data.

3. The method according to claim 1, wherein the CQI adjustment value is transmitted to the UE through Radio Resource Control, Media Access Control or Physical Downlink Control Channel.

4. The method according to claim 1, wherein the base station coordination type includes a high power node and one or a plurality of lower power nodes.

5. The method according to claim 1, wherein the CQI is calculated at the UE by subtracting the CQI adjustment value from an original CQI.

6. The method according to claim 1, wherein the CQI is calculated at the UE by multiplying an original CQI by the CQI adjustment value.

7. The method according to claim 1, further comprising receiving, from the UE, information identifying the base station coordination type, for which the CQI is reported from the UE.

8. A base station comprising:
    circuitry which, in operation, sets a channel quality indicator (CQI) adjustment value for a base station coordination type, the base station coordination type defining which base stations among a plurality of base stations perform coordinated transmission, the CQI adjustment value being set according to traffic loading conditions of the plurality of base stations;
    a transmitter which, in operation, transmits, to a user equipment (UE), the CQI adjustment value; and
    a receiver which, in operation, receives a CQI reported from the UE, the CQI being calculated at the UE in reference to the CQI adjustment value; and
    a scheduler which, in operation, assigns a resource to the UE in reference to the received CQI.

9. The base station according to claim 8, wherein the base station coordination type is one of a plurality of base station coordination types that are hypotheses defining different coordinated transmissions performed by the plurality of base stations, each of which performs transmission of data or no transmission of data.

10. The base station according to claim 8, wherein the transmitter transmits the CQI adjustment value to the UE through Radio Resource Control, Media Access Control or Physical Downlink Control Channel.

11. The base station according to claim 8, wherein the base station coordination type includes a high power node and one or a plurality of lower power nodes.

12. The base station according to claim 8, wherein the CQI is calculated at the UE by subtracting the CQI adjustment value from an original CQI.

13. The base station according to claim 8, wherein the CQI is calculated at the UE by multiplying an original CQI by the CQI adjustment value.

14. The base station according to claim 8, wherein the receiver receives, from the UE, information identifying the base station coordination type, for which the CQI is reported from the UE.

* * * * *